(12) United States Patent
Tushinskiy

(10) Patent No.: US 11,301,883 B1
(45) Date of Patent: *Apr. 12, 2022

(54) VOICE SURVEY COLLECTION AND ANALYSIS

(71) Applicant: INSTREAMATIC, INC., Palo Alto, CA (US)

(72) Inventor: Stanislav Tushinskiy, Mountain View, CA (US)

(73) Assignee: INSTREAMATIC, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/467,487

(22) Filed: Sep. 7, 2021

(51) Int. Cl.
| G06Q 30/02 | (2012.01) |
| G10L 15/16 | (2006.01) |
| G10L 15/22 | (2006.01) |
| G10L 15/02 | (2006.01) |

(52) U.S. Cl.
CPC ..... *G06Q 30/0203* (2013.01); *G06Q 30/0201* (2013.01); *G06Q 30/0245* (2013.01); *G10L 15/02* (2013.01); *G10L 15/16* (2013.01); *G10L 15/22* (2013.01)

(58) Field of Classification Search
CPC .......... G06Q 30/0203; G06Q 30/0201; G06Q 30/0245; G10L 15/02; G10L 15/16; G10L 15/22

See application file for complete search history.

(56) References Cited

U.S. PATENT DOCUMENTS

| 9,336,268 | B1* | 5/2016 | Moudy | G06F 16/24578 |
| 9,396,490 | B1* | 7/2016 | Marx | G06Q 30/0282 |
| 9,854,315 | B1* | 12/2017 | Trollope | G10L 19/018 |
| 2014/0278920 | A1* | 9/2014 | Holden | G06Q 30/0245 |
| | | | | 705/14.44 |
| 2018/0232752 | A1* | 8/2018 | BaderEddin | G10L 15/22 |
| 2020/0294102 | A1* | 9/2020 | konduru Srinivasa | |
| | | | | G06Q 30/0282 |
| 2021/0304142 | A1* | 9/2021 | Bar-on | G06F 8/73 |

OTHER PUBLICATIONS

"A machine learning approach to product review disambiguation based on function, form and behavior classification" (Singh et al. published on Mar. 20, 2017 at www.elsevier.com in the "Decision Support Systems" Elsevier Journal) (Year: 2017).*

* cited by examiner

Primary Examiner — James M Detweiler
(74) Attorney, Agent, or Firm — Georgiy L. Khayet

(57) ABSTRACT

Methods and systems for Artificial Intelligence (AI)-based analysis of oral surveys are provided. An example method commences with prompting a user to provide an oral survey concerning a subject. The method further includes providing the user with an interface configured to receive the oral survey. The method includes receiving, via the interface, the oral survey concerning the subject in a free format. The method further includes analyzing the oral survey with the AI to determine key parameters associated with the subject. The method further includes generating a structured survey report concerning the subject based on the key parameters.

19 Claims, 6 Drawing Sheets

500

```
Prompt a user to provide an oral survey concerning a subject
505
          ↓
Provide the user with an interface configured to receive the oral survey
510
          ↓
Receive, via the interface, the oral survey concerning the subject in a free format
515
          ↓
Analyze the oral survey with the AI to determine key parameters associated with the subject
520
          ↓
Based on the key parameters, generate a structured survey report concerning the subject
525
```

*FIG. 5*

VOICE SURVEY COLLECTION AND ANALYSIS

TECHNICAL FIELD

This disclosure generally relates to the field of survey collection. Specifically, this disclosure relates to methods and systems for collecting and analyzing voice surveys.

BACKGROUND

Conventional survey collection systems typically ask users to fill out questionnaires. A questionnaire can be a multiple page document requiring a user to answer a list of questions. Some questions may relate to the subject of the survey, such as a product or service, while other questions may ask the user to provide their demographic data, such as name, gender, age, residence, and so forth. Additionally, some questions may ask users to rate the subject of the survey on a scale from one to ten. However, some users may not wish to share personal information, while other users may find it too burdensome and time-consuming to go through the multiple page document and answer multiple questions. Moreover, depending on the circumstances, it may be inconvenient for the user to manually fill out a questionnaire, for example, when the user responds to a survey using a mobile phone.

SUMMARY

This section introduces a selection of concepts in a simplified form that are further described in the Detailed Description section, below. This summary does not identify key or essential features of the claimed subject matter and is not intended to be an aid in determining the scope of the claimed subject matter.

The present disclosure is directed to systems and methods for Artificial Intelligence (AI)-based analysis of oral surveys. According to an example embodiment, a system for AI-based analysis of oral surveys is provided. The system may include a user device, an acoustic sensor associated with the user device, a processor communicatively coupled to the user device and the acoustic sensor, and a remote computing system communicatively coupled to the processor. The processor may be configured to prompt a user to provide, via the user device, an oral survey concerning a subject of the survey. The processor may be further configured to provide, via the user device, the user with an interface configured to receive the oral survey. The processor may be further configured to receive, via the interface and the acoustic sensor, the oral survey concerning the subject in a free format. The remote computing system may be configured to analyze the oral survey with the AI to determine key parameters associated with the subject. The remote computing system may be further configured to generate a structured survey report concerning the subject based on the key parameters.

According to another example embodiment, a method for AI-based analysis of oral surveys is provided. The method may commence with prompting a user to provide an oral survey concerning a subject. The method may include providing the user with an interface configured to receive the oral survey. The method may further include receiving, via the interface, the oral survey concerning the subject in a free format. The method may continue with analyzing the oral survey with the AI to determine key parameters associated with the subject. The method may further include generating a structured survey report concerning the subject based on the key parameters.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

FIG. 5 is a flow chart showing a method for AI-based analysis of oral surveys, according to an example embodiment.

DETAILED DESCRIPTION

Figure 1:
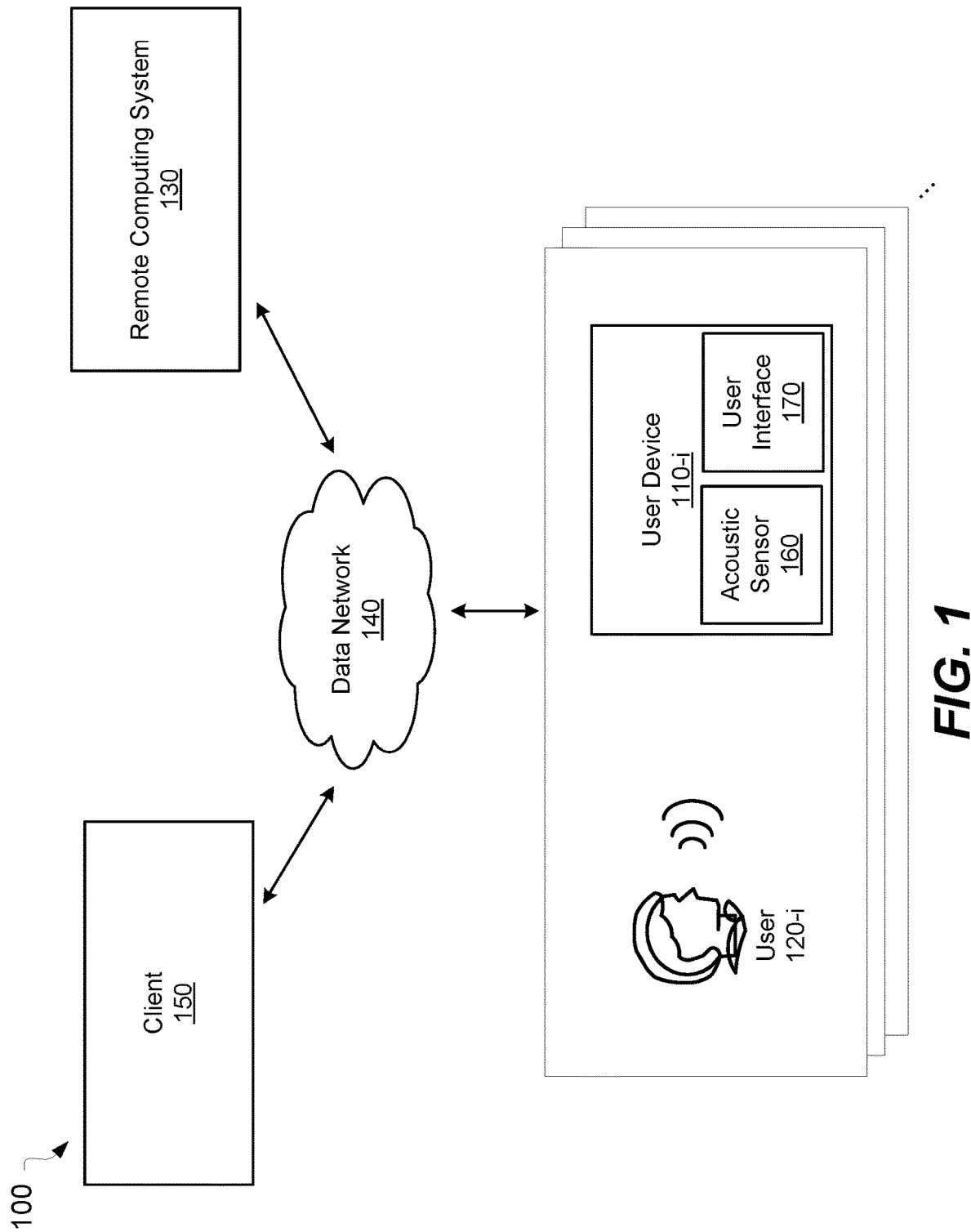
FIG. 1 is a block diagram showing an example environment, in which a system and a method for AI-based analysis of oral surveys can be implemented, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

The technology described herein is concerned with systems and methods for AI-based analysis of oral surveys. According to an example embodiment of the present disclosure, a system for AI-based analysis of oral surveys is provided. The system may be associated with user devices of a plurality of users and may include a remote AI-based computing system.

The system may use a user device to prompt a user to provide an oral survey (also referred to herein as voice surveys) concerning a subject. For example, the prompt may be provided in a form of a link in an e-mail or text message, in a Quick Response (QR) code, in an advertising message provided in a video or audio content to the user, and so forth. The user may select the link to initiate the oral survey. In response to the selection of the link, the system may provide, via the user device, a user interface configured to receive the oral survey. Upon determining that the user has accessed the user interface, an acoustic sensor (e.g., a microphone) of the user device may be activated. The user interface may prompt the user to provide the oral survey concerning the subject in a free format. In an example embodiment, the user interface may display a record button. The user may click on the record button and talk about the subject (i.e., provide user feedback in a free format) for a predetermined time. After the user presses the record button, the user device may record the ambient acoustic signal of the oral survey. In the oral survey, the user may describe their experience of interacting with the subject, advantages and disadvantages of the subject, and provide any other information the user finds relevant with respect to the subject.

In another example embodiment, upon determining that the user has entered the user interface, a processor of the user device may monitor, via the acoustic sensor, an ambient acoustic signal to detect the presence of the voice of the user. If the voice is detected, the processor may record, via the acoustic sensor, the ambient acoustic signal for a predetermined time to obtain the oral survey in a free format.

Upon recording the ambient acoustic signal, the user device may provide the ambient acoustic signal containing the oral survey to a remote computing system. The remote computing system may analyze the oral survey using the AI. Specifically, the remote computing system may perform speech recognition of the recorded ambient acoustic signal to obtain a text response and analyze the text response. The remote computing system may further analyze the tone, speed, volume of the user voice, and emotional state of the user. The remote computing system may further determine user-related information based on the oral survey and other data associated with the user device. The user-related information may include a gender, location, age, and so forth.

Based on the analysis, the remote computing system may determine key parameters associated with the subject. The key parameters may be determined by parsing the oral survey, determining keywords in the oral survey, and analyzing the keywords to determine which keywords are key parameters of the subject specifically rated or mentioned by the user. Based on the key parameters, the remote computing system may generate a structured survey report concerning the subject. The structured survey report may be provided to a client that requested to conduct the oral survey. The structured survey report may be provided in a form of a completed questionnaire summarizing the information provided by the user.

In an example embodiment, the system may prompt multiple users to provide oral surveys. The system may analyze the oral surveys received in the form of voice answers from the users. Based on the analysis, the system may determine common parameters of the subject mentioned by multiple users in the oral surveys. The system may then analyze the common parameters and generate an aggregated survey report based on an analysis of the oral surveys received from multiple users. The system may provide the aggregated survey report to the client. The aggregated survey report may include analytical and statistical data associated with responses of the multiple users and may include graphs, diagrams, spreadsheets, and so forth.

Thus, in contrast to conventional survey forms that include multiple pages or a long webpage of fixed questions (such as "What is your name/gender/age?", "Where do you live?", "Rate from one to ten"), the system of the present disclosure enables users to provide oral responses to a survey in a free format without the need for the user to answer specific questions. The user can provide responses to the oral survey by talking during a predetermined time interval about the subject of the survey and provide information that the user considers relevant to the subject of the survey.

Moreover, in contrast to conventional surveys, the system of the present disclosure does not require the user to respond to a list of predetermined questions. Instead, key parameters that appeared to be relevant to the subject or important to the user are determined by the system automatically using the AI based on the analysis of the oral survey. In other words, the AI can be configured to understand what information (i.e., key parameters) users want to highlight in oral surveys.

Furthermore, a client that requested to conduct a survey may receive the survey results in the form of a structured, ready-made, and completed questionnaire. The AI can be configured to determine, based on the analysis of the oral surveys, which parameters of the subject should be included in the completed questionnaire presented to the client. The key parameters of aggregated multiple oral surveys can be scored such that the client receives a completed questionnaire with the key parameters of the subject aggregated and scored.

The AI, as used herein, refers to software techniques that analyze problems similar to human thought processes, or at least mimic the results of such thought processes, through the use of software for machine cognition, machine learning algorithmic development, and related programming techniques. Thus, in the context of the present disclosure, AI refers to the algorithmic improvements over original algorithms by application of such software, particularly with the use of data collected in the processes disclosed in this application.

Referring now to the drawings, FIG. 1 shows an example environment 100, in which a system and a method for AI-based analysis of oral surveys can be implemented. The environment 100 may include one or more user devices 110-$i$, users 120-$i$, (i=1, . . . , N) associated with the user devices 110-$i$, a remote computing system 130, a client 150, and a data network 140.

The user device 110-$i$ may include, but is not limited to, a laptop computer, a desktop computer, a tablet computer, a phablet, a smart phone, a personal digital assistant, a media player, a mobile telephone, a smart television set, in-vehicle infotainment system, a smart home device, and the like. An example user device 110-$i$ is described in detail in FIG. 2. Each of the user devices 110-$i$ (i=1, . . . , N) can include transmitters, transceivers, wired and/or wireless telecommunications and/or networking devices, amplifiers, audio and/or video players, encoders, decoders, speakers, inputs, outputs, storage devices, user input devices, and the like. The user device 110-$i$ can be configured to communicate with the remote computing system 130.

The client 150 may request that the remote computing system 130 conduct a survey on a subject. For the subject, which may include products or services, the client may provide a manufacturer of the products, a provider of the services, a marketer, or any other entity. The subject of the survey may be related to a product associated with the manufacturer of the product, a service associated with a provider of the service, and the like. The request to conduct the survey may include information related to the subject, one or more questions related to the subject, and any other data.

The user device 110-$i$ can be configured to receive data and provide the data to the user 120-$i$. The data may include a website content, a broadcast, including a television, an Internet radio, an Internet television, a video stream provided via social media, podcast, and so forth. The data may also include data stored locally in memory of the user device 110-$i$ or remotely in a storage associated with the remote computing system 130. The data may include video content, audio content, text, images, and so forth.

In the course of receiving the data mentioned above, the user device 110-$i$ may receive a prompt to provide an oral survey concerning a subject. For example, the prompt may include a notification provided via a link, a text message, a QR code printed on a product, a record button, a voice prompt, and so forth. The prompt may be provided via an e-mail, on a website, in a text message received via a small message service or messengers, as part of an advertising message, as part of a message shown during consuming a video or audio stream by the user device 110-$i$ (e.g., when the user watches TV or listens to the music using the user device 110-$i$). In further embodiments, a QR code and an invitation to provide an oral survey may be provided on any product at any location. The user 120-$i$ may scan the QR code using a camera of the user device 110-$i$. Upon scanning the QR code, the user device 110-$i$ can open a link encoded in the QR code.

In an example embodiment, the prompt may further include a question to which the user 120-$i$ is asked to respond in the oral query. Example questions may include "How old is your car?," "What do you think about this food?," "Do you like your new iPhone?," feedback-related questions such as "You stayed at our hotel, what do you think about it?," and so forth.

If the user 120-$i$ agrees to provide the oral survey, the user 120-$i$ may click the link, open the message, or scan the QR code or otherwise respond to the prompt using the user device 110-$i$. The user device 110-$i$ may determine that the user 120-$i$ has responded to the prompt (e.g., opened a link) and, based on the determination, provide an interface (shown as a user interface 170) to the user device 110-$i$ and open the interface. The interface may be configured to receive the oral survey from the remote computing system 130.

In an example embodiment, the user interface 170 may prompt the user 120-$i$ to provide the oral survey concerning the subject in a free format. For example, the user interface 170 may present a record button on a screen of the user device 110-$i$. The user 120-$i$ may click on the record button and speak about the subject for a predetermined time. The user device 110-$i$ may record an ambient acoustic signal after the user 120-$i$ presses the record button.

In another example embodiment, the processor of the user device 110-$i$ cam determine that the user 120-$i$ has entered the user interface 170 (for example, the user 120-$i$ has clicked on a link within a message). Based on the determination that the user 120-$i$ has entered the user interface 170, the processor may monitor, via the acoustic sensor 160, an ambient acoustic: signal to detect the presence of the voice of the user 120-$i$. If the voice is detected, the processor may record, via the acoustic sensor 160, the ambient acoustic signal for a predetermined time to obtain the oral survey in a free format.

In some embodiments, the user device 110-$i$ may receive the data using the data network 140. The data network 140 can refer to any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network), Wi-Fi™ network, packet switching communications network, circuit switching communications network), Bluetooth™ radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, the data network 140 includes a corporate network, data center network, service provider network, mobile operator network, or any combinations thereof.

In some embodiments, the remote computing system 130 may be implemented as a server(s) or a cloud-based computing resource(s) shared by multiple users. The remote computing system 130 can include hardware and software available at a remote location and accessible over the data network 140. The remote computing system 130 can be dynamically re-allocated based on demand. The cloud-based computing resources may include one or more server farms/clusters including a collection of computer servers which can be co-located with network switches and/or routers.

In some embodiments, the user device 110-$i$ can record, via the acoustic sensor, the oral survey concerning the subject from the user 120-$i$ and send the oral survey in form of audio data to the remote computing system 130. The remote computing system 130 can be configured to receive oral surveys of users 120-$i$ over the data network 140 and perform speech recognition of the oral surveys in the form of audio data to obtain the oral surveys of the users 120-$i$ in the form of text. The remote computing system 130 can be configured to analyze the oral surveys to determine analytical and statistical data associated with the oral surveys and provide the analytical and statistical data to the client 150.

Specifically, the remote computing system 130 can be configured to analyze the oral survey with the AI, through machine learning techniques, to determine key parameters associated with the subject. The key parameters may include characteristics of the product characterized by the user 120-$i$ in the oral survey. The key parameters may be determined by parsing the oral survey, determining keywords in the oral survey, and analyzing the keywords to determine which keywords are key parameters of the subject rated or mentioned by the user 120-$i$. For example, the oral survey may be requested by a hotel in which the user 120-$i$ stayed recently and may include a prompt "Hi John! We were so glad to see you in our hotel, we would like to receive your feedback. Please tell us what you think about our hotel." The user 120-$i$ may provide his feedback in a free format (i.e., by telling everything and in any form the user 120-$i$ wants) by speaking for a predetermined time. The oral survey of the user 120-$i$ may be, for example, as follows: "In general, staying in the hotel was not bad. Breakfast was disappointing, but the bed was comfortable, people were noisy, but it's all right, my wife and I had a good time."

In certain embodiments, the remote computing system 130 can be configured to analyze characteristics of the audio data, such as a tone of voice, volume of voice, speed of voice, background noise, and so forth. The characteristics determined based on the oral survey may be used to determine which words the user 120-$i$ emphasizes, an emotional state of the user 120-$i$ (in order to determine whether the feedback of the user 120-$i$ is positive or negative), and other parameters.

The key parameters determined by the remote computing system 130 using an AI survey analysis module of the system in this oral survey may include: "breakfast," "disappointing," "bed," "comfortable," "people," "noisy", "had a good time." The AI survey analysis module may further determine a correlation between the key parameters, e.g., "breakfast"—"disappointing," "bed"—"comfortable," "people"—"noisy", "overall evaluation"—"good."

Based on the key parameters, the remote computing system may generate a structured survey report concerning the subject. The structured survey report can be provided to a client that requested to conduct the survey. The structured survey report may be provided in a form of a completed questionnaire summarizing the information provided by the user 120-*i*.

Figure 2:
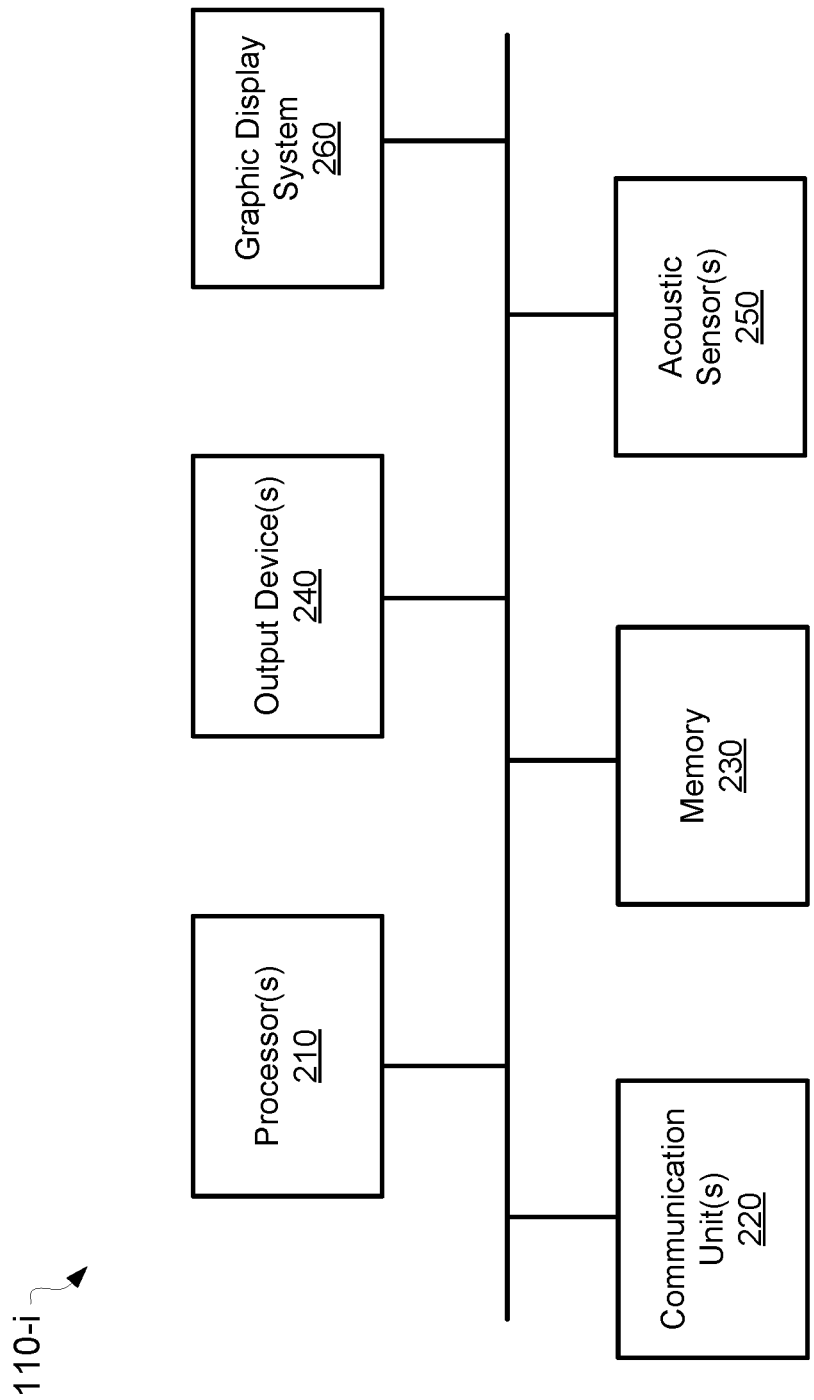
FIG. 2 is a block diagram showing a user device for collecting oral surveys, according to an example embodiment.

FIG. 2 is a block diagram showing a user device 110-*i* for collecting voice surveys, according to an example embodiment. FIG. 2 provides details of the user device 110-*i* of FIG. 1. In the illustrated embodiment, the user device 110-*i* may include one or more processor(s) 210, one or more communication unit(s) 220, a memory 230, one or more output device(s) 240, one or more acoustic sensor(s) 250, and a graphic display system 260. In other embodiments, the user device 110-*i* includes additional or other components necessary for operations of user device 110-*i*. Similarly, in certain embodiments, the user device 110-*i* includes fewer components that perform functions similar or equivalent to those depicted in FIG. 2.

In various embodiments, the processor(s) 210 include hardware and/or software, which is operable to execute instructions stored in the memory 230. The processor(s) 210 may perform floating point operations, complex operations, and other operations, including analyzing ambient acoustic signals to detect words spoken by users. The processor(s) 210 may include general purpose processors, video processors, audio processing systems, and so forth.

In various embodiments, the communication unit(s) 220 can be configured to communicate with a network such as the Internet, WAN, LAN, cellular network, and so forth, to receive audio and/or video data of media streams. The received audio and/or video data may then be forwarded to the processor(s) 210 and the output device(s) 240. The processors 210 may be configured to monitor, via the acoustic sensor(s) 250, an ambient acoustic signal to detect a presence of a voice of a user.

The acoustic sensor(s) 250 can include one or more microphones. The processors 210 can be configured to receive acoustic signals from an acoustic source, for example the user 120-*i*, via acoustic sensor(s) 250. Specifically, if the voice is detected in the ambient acoustic signal, the processor(s) 210 may record, via the acoustic sensor(s) 250, the ambient acoustic signal for a predetermined time to obtain the oral survey in a free format.

The processor(s) 210 may be configured to send the recorded oral survey to a remote computing system 130 shown in FIG. 1 for processing. In some example embodiments, the processing can be performed at least partially on a side of the user device 110-*i*. Specifically, the processor(s) 210 may be configured to process the acoustic signal to determine presence of keywords in a voice of the user 120-*i* and determine other characteristics of the voice, such as a tone, speed, emotional state, and so forth. The acoustic sensor(s) 250 can be spaced a distance apart to allow the processor(s) 210 to perform a noise and/or echo reduction in received acoustic signals.

In some embodiments, the output device(s) 240 may include any device which provides an audio output to a listener (for example, the user 120-*i*). The output device(s) 240 may include one or more speaker(s), an earpiece of a headset, a handset, and the like.

In various embodiments, the graphic display system 260 can be configured to provide a graphic user interface, also referred to herein a user interface or an interface. In some embodiments, a touch screen associated with the graphic display system 260 can be utilized to receive an input from a user.

Figure 3:
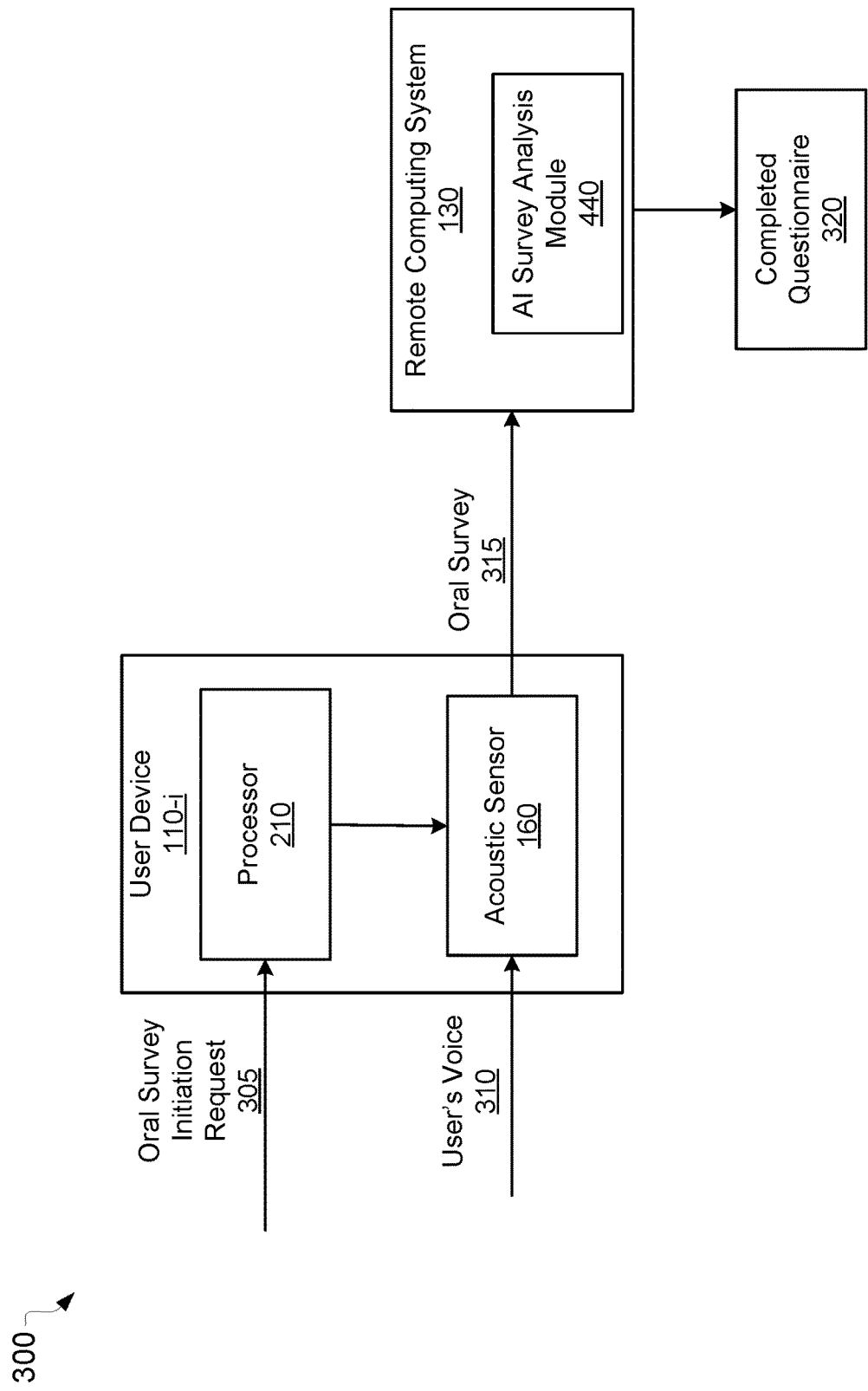
FIG. 3 is a block diagram illustrating an example communication between a user device and a remote computing system for collecting and analyzing oral surveys, according to an example embodiment.

FIG. 3 is a block diagram illustrating an example communication between a user device 110-*i* and a remote computing system 130 for collecting and analyzing oral surveys, according to an example embodiment. The user device 110-*i* may receive an oral survey initiation request 305 with a prompt to provide, via the user device 110-*i*, an oral survey concerning a subject. The oral survey may be initiated via one or more of the following: a link, a text message, a QR code printed on a product, a record button, a voice prompt, and so forth.

In response to receiving of the oral survey initiation request 305, the processor 210 of the user device 110-*i* may provide, via the user device 110-*i*, the user with an interface configured to receive the oral survey. After providing the interface to the user, the processor 210 may record, via the interface and the acoustic sensor 160, a user's voice 310. The user's voice 310 may include an oral survey 315 provided by the user in respect of the subject. The user may provide the oral survey 315 in a free format, for example, may use any words, any sentence structure, and the like.

The user device 110-*i* may send the oral survey 315 to the remote computing system 130 for further processing. The remote computing system 130 may have an AI survey analysis module 440 configured to analyze the oral survey 315 and generate a structured survey report concerning the subject based on the analysis. In an example embodiment, the structured survey report may be provided in a form of a completed questionnaire 310 to a client that requested to conduct the survey related to the subject.

Figure 4:
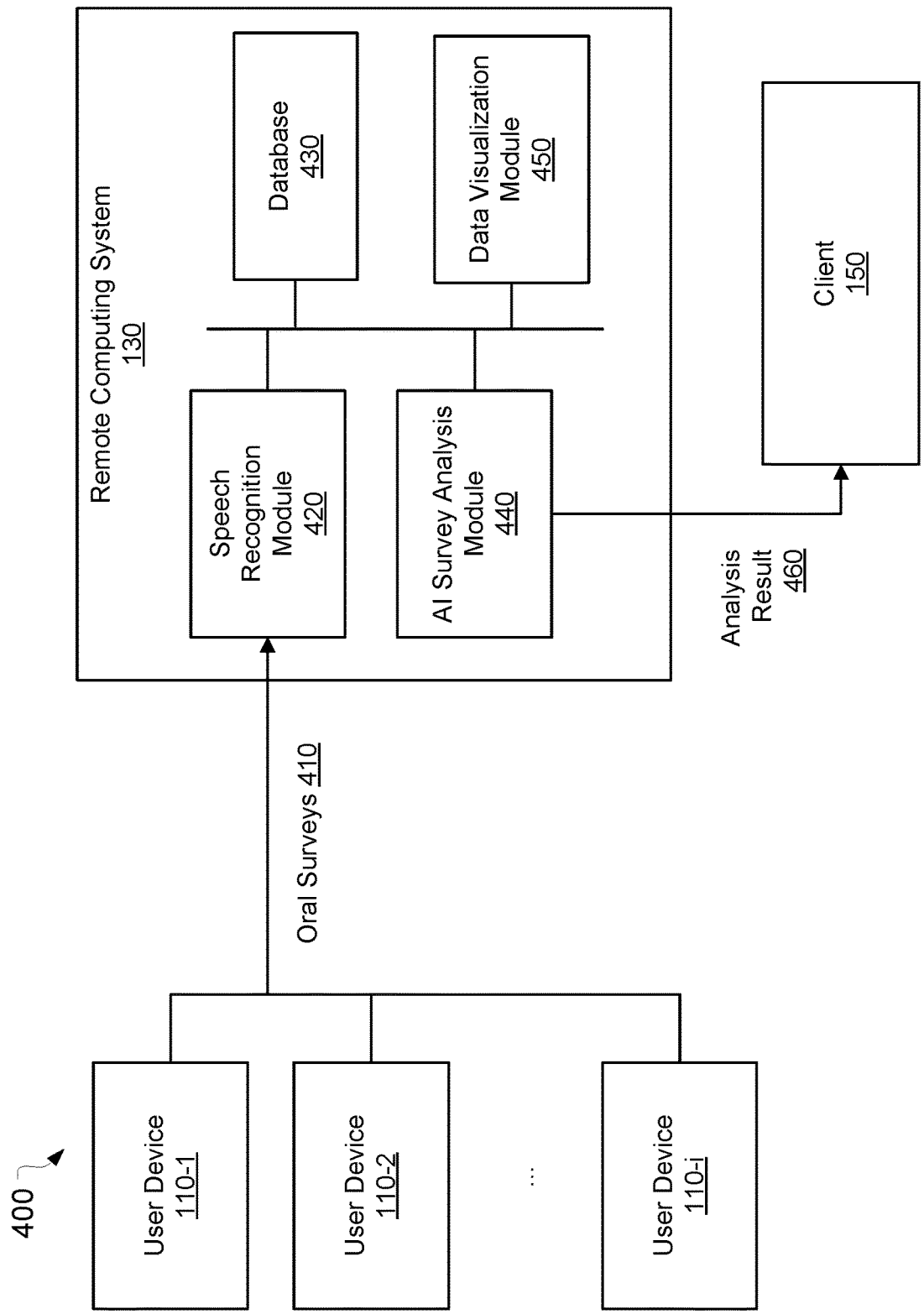
FIG. 4 is a block diagram illustrating an example system for AI-based analysis of oral surveys, according to an example embodiment.

FIG. 4 is a block diagram showing a system 400 for AI-based analysis of oral surveys, according to some example embodiments. The system 400 may include one or more user devices 110-*i* and a remote computing system 130. Each of user devices 110-*i* may have a processor 210 as shown in FIG. 2 and an acoustic sensor 160 as shown in FIG. 1. A plurality of user devices 110-*i* may be in communication with the remote computing system 130. The remote computing system 130 may include a speech recognition module 420, a database 430, an AI survey analysis module 440, and a data visualization module 450.

In certain embodiments, the modules 420, 430, 440, and 450 can be implemented as instructions stored in a memory and executed by one or more processor(s) associated with the remote computing system 130.

A client 150 may request the remote computing system 130 to conduct a survey related to a subject. The subject may be related to a product associated with a manufacturer of the product, a service associated with a provider of the service, and the like. In example embodiments, the subject may include one of a product, a service, a policy, and the like.

The remote computing system 130 may send, to the plurality of user devices 110-*i*, a prompt to provide, via the user device 110-*i*, an oral survey concerning a subject. The prompt may be sent by the remote computing system 130 to multiple users at the same time or sequentially within a predetermined period of time.

The processors of the user device 110-*i* may receive a prompt from the remote computing system 130 in a form of a link, a text message, a QR code printed on a product, a record button, and a voice prompt, a portion of content, an advertising message, and so forth. In an example embodiment, the user may be prompted to provide the oral survey during an advertising message, which may be played, for example, in a video or audio content.

The processors may prompt users of user devices 110-i to provide, via the user devices 110-i, an oral survey 410 concerning the subject. The prompt may include presenting a link to the user, playing a message to the user, showing a portion of the content to the user, and so forth. The users may decide to provide the oral survey 410 and respond to the prompt, e.g., by clicking on the link or message. In response to the click, the processors may provide, via the user devices 110-i, the users with an interface configured to receive the oral survey.

Upon determining that the user has accessed the interface, an acoustic sensor (e.g., a microphone) of the user device 110-i may be activated. The interface may prompt the user to provide the oral survey concerning the subject in a free format. In an example embodiment, the interface may present a record button to the user. The user may click on the record button and speak about the subject for a predetermined time. The user device 110-i may record the ambient acoustic signal after the user presses the record button.

In another example embodiment, upon determining that the user has accessed the interface, the processor of the user device 110-i may monitor, via the acoustic sensor, an ambient acoustic signal to detect the presence of the voice of the user. If the voice is detected, the processor may record, via the acoustic sensor, the ambient acoustic signal for a predetermined time to obtain the oral survey in a free format.

Thus, the processor of the user device 110-i may receive, via the interface and the acoustic sensor, the oral survey 410 concerning the subject in a free format. The user device 110-i may send the oral survey 410 to the remote computing system 130. The speech recognition module 410 may parse the oral survey 410 to convert the oral survey 410 into text surveys. The speech recognition module 410 may recognize the portion of the ambient acoustic signal based on the vocabulary stored in the database 430. In response to the recognition of the portion of the ambient acoustic signal, the speech recognition module 420 may generate text and provide the text to the AI survey analysis module 440.

Upon parsing, the oral survey converted into the text survey is analyzed by the AI survey analysis module 440 using the AI. The analysis may include determining key parameters associated with the subject. Based on the key parameters, the data visualization module 450 may generate a structured survey report concerning the subject.

The remote computing system 130 may receive a plurality of further oral surveys concerning the subject from other user devices 110-i associated with the plurality of users. The AI survey analysis module 440 may analyze the plurality of further oral surveys using the AI to determine a set of common parameters associated with the subject. Based on the set of common parameters, the data visualization module 450 may generate an aggregated survey report for the plurality of users based on a plurality of structured survey reports associated with the users.

In an example embodiment, the AI survey analysis module 440 may detect presence of voice of a user in the ambient acoustic signal received in oral survey 410. The AI survey analysis module 440 may also detect the presence of words or phrases in the voice of the user. In an example embodiment, the AI survey analysis module 440 may analyze the ambient acoustic signal using machine learning algorithms to detect words or phrases in the oral survey. The AI survey analysis module 440 may be configured to determine which words are relevant to the subject and which words are irrelevant to the subject. For example, words relating to a room size, breakfast, and the like may be determined as relevant to the subject. In the phrase, "My wife and I had a good rest," the word "wife" may be determined to be irrelevant to the subject because the wife is part of user experience but is not relevant to the hotel. Relevant words may be determined to be the key parameters associated with the subject.

If a word or a phrase is found in a predetermined number of oral surveys 410, the AI survey analysis module 440 may determine the word or the phrase to be a common parameter of the oral surveys 410.

The analysis may further include breaking down a user speech of the oral survey 410 by parameters, determining the key parameters related to the subject, detecting keywords in the user speech, and scoring the key parameters based on the keywords. The keywords may be scored based on one or more of the following: a tone, a volume, a speed, a background noise, an emotional level of the user's voice, and so forth.

The AI survey analysis module 440 may be configured to generate analytical data associated with the oral surveys 410 and determine statistics results associated with the oral surveys 410. The remote computing system 130 may be configured to provide the analysis results 460 to the client 150 in form of the aggregated survey report or the structured survey report. The aggregated survey report and the structured survey report may include a data visualization. The data visualization may include a graph, a diagram, a spreadsheet, and the like built by the AI survey analysis module 440 based on the analysis of the oral surveys 410.

In an example embodiment, the aggregated survey report or the structured survey report may include a completed questionnaire. The completed questionnaire may include the common parameters associated with the subject and found in the oral surveys 410 and rates assigned to the common parameters by the users in the oral surveys 410.

For example, even though the users were not asked specific questions, a predetermined number of users in their oral surveys may rate the room size as "sufficient," "OK" or "good", rate the cleanness in a room as "fine," "clean," or "sterile," and rate the breakfast as "bad," "small," or "not great." The AI survey analysis module 440 may determine that the room size, the cleanness, and the breakfast are key parameters in each oral survey and are common parameters in multiple oral surveys. The AI survey analysis module 440 may analyze and score the keywords "sufficient," "OK," and "good" based on predetermined criteria and determine that these keywords correspond to 7 on a scale from 1 to 10. The AI survey analysis module 440 may analyze and score the keywords "fine," "clean," and "sterile" based on predetermined criteria and determine that these keywords correspond to 10 on a scale from 1 to 10. The AI survey analysis module 440 may further analyze and score the keywords "bad," "small," and "not great" based on predetermined criteria and determine that these keywords correspond to 4 on a scale from 1 to 10. The completed questionnaire provided to the client may include common parameters and their corresponding rates, for example, "room size"—7, "cleanness"—10, and "breakfast"—4.

In an example embodiment, the remote computing system 130 may be further configured to detect one or more stand-out parameters in the set of common parameters. The one or more stand-out parameters may include key parameters that exceed one or more threshold values. Based on the determination of the one or more stand-out parameters, the remote computing system 130 may issue an alert concerning the one or more stand-out parameters and send the alert to the client 150. For example, the AI survey analysis module 440 may determine that a predetermined number of oral surveys 410 includes key parameters "bed" and "uncomfortable." The AI survey analysis module 440 may determine that these key parameters exceed a threshold value. The alert concerning the one or more stand-out parameters may include, for example, an indication that "50% of users rate the bed as uncomfortable." Therefore, if a key parameter repeats or exceeds a threshold in oral surveys of multiple users (e.g., the majority of users said "Breakfast was bad"), this key parameter is emphasized in the survey results provided to the client 150 to notify the client 150 that this key parameter needs attention of the client 150.

In an example embodiment, the analysis of the oral survey may include determining demographics associated with the user. The demographics may be determined based on the analysis of the voice (e.g., a gender, an age), analysis of metadata associated with the user device 110-$i$ (e.g., a phone model, a location), and data received from third parties (e.g., statistics or demographics for a specific location). In some embodiments, the user can be identified based on a unique link sent to the user with an invitation to provide the oral survey. The system may also use the metadata of the user device to determine that the user is a known user that communicated with the system in the past. The analysis may further include grouping of users into clusters based on predetermined parameters (e.g., a location, an age, and a time of shopping), determining common key parameters for clusters of users, and so forth.

FIG. 5 is a flow chart showing a method 500 for AI-based analysis of oral surveys, according to an example embodiment. The method 500 can be implemented by using the system 400 shown in FIG. 4. In some embodiments, the operations of method 500 may be combined, performed in parallel, or performed in a different order. The method 500 may also include additional or fewer operations than those illustrated.

The method 500 may commence in block 505 with prompting, by a processor associated with a user device, a user to provide an oral survey concerning a subject. The oral survey may be initiated via one or more of the following, a link, a text message, a QR code printed on a product, a record button, a voice prompt, and so forth.

The method 500 may continue in block 510 with providing, by the processor associated with the user device, the user with an interface configured to receive the oral survey. The method 500 may continue in block 515 with receiving, by the processor via the interface, the oral survey concerning the subject in a free format.

The method 500 may continue in block 520 with analyzing, by the remote computing system, the oral survey with the AI to determine key parameters associated with the subject. The analysis of the oral survey may include determining demographics associated with the user. The analysis may further include breaking down the user speech by parameters, determining the key parameters related to the subject, detecting keywords in the user speech, and scoring the key parameters based on the keywords. The method 500 may continue in block 525 with generating, by the remote computing system and based on the key parameters, a structured survey report concerning the subject.

The method 500 may further include receiving a plurality of further oral surveys concerning the subject from a plurality of users. The plurality of further oral surveys can be analyzed using the AI to determine a set of common parameters associated with the subject. An aggregated survey report for the plurality of users can be generated based on the set of common parameters. The method 500 may further include providing the aggregated survey report to a client.

The method 500 may further include detecting one or more stand-out parameters in the set of common parameters. The one or more stand-out parameters may include key parameters that exceed one or more threshold values. The method 500 may further include issuing an alert concerning the one or more stand-out parameters and sending the alert to the client.

Figure 6:
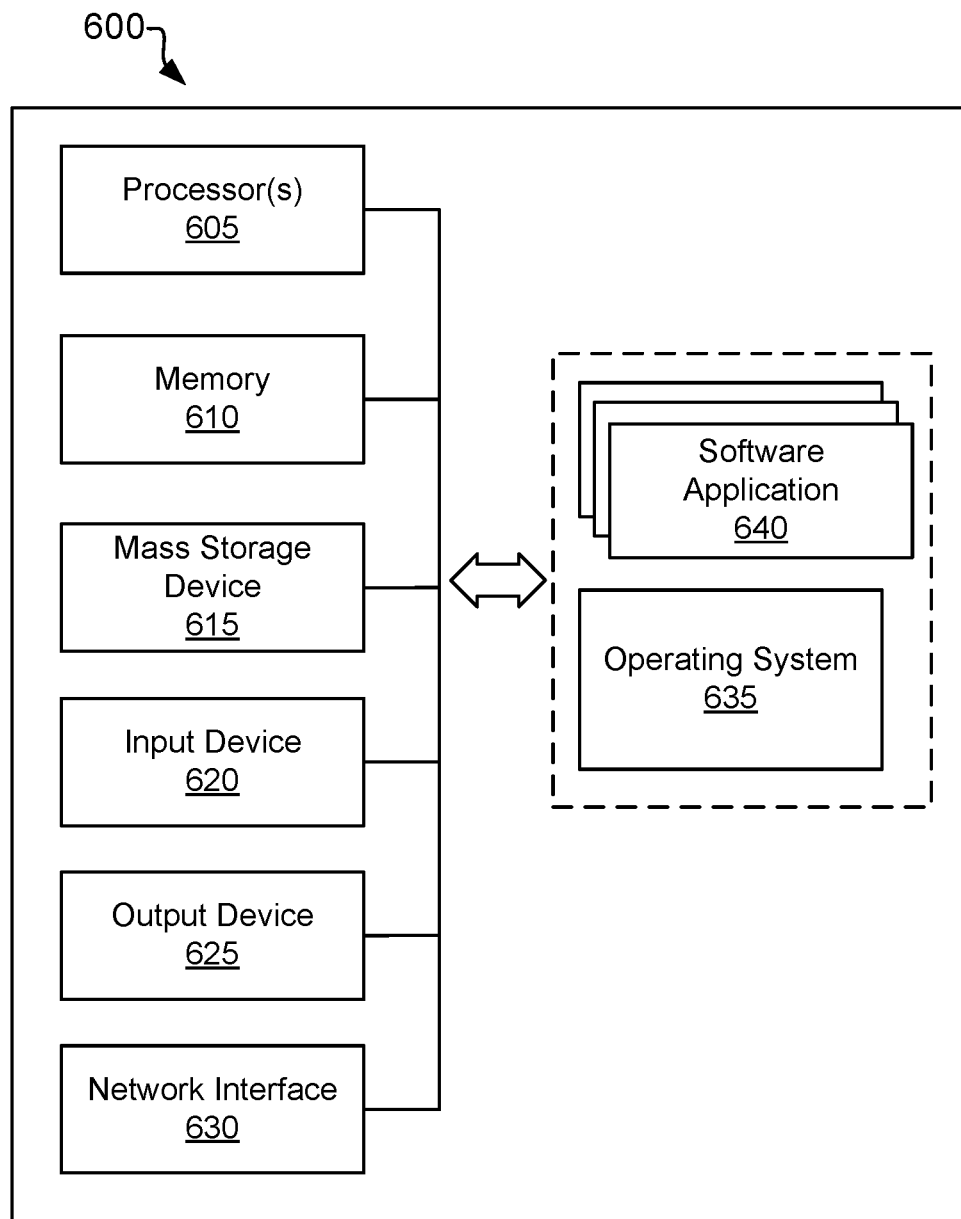
FIG. 6 is a high-level block diagram illustrating an example computer system, within which a set of instructions for causing the machine to perform any one or more of the methodologies discussed herein can be executed.

FIG. 6 is a high-level block diagram illustrating an example computer system 600, within which a set of instructions for causing the machine to perform any one or more of the methodologies discussed herein can be executed. The computer system 600 may include, refer to, or be an integral part of, one or more of a variety of types of devices, such as a general-purpose computer, desktop computer, laptop computer, tablet computer, netbook, mobile phone, smartphone, personal digital computer, smart television device, and server, among others. In some embodiments, the computer system 600 is an example of user device(s) 110-$i$ or remote computer system 130. Notably, FIG. 6 illustrates just one example of the computer system 600 and, in some embodiments, the computer system 600 may have fewer elements/modules than shown on FIG. 6 or more elements/modules than shown on FIG. 6.

The computer system 600 includes one or more processors 605, a memory 610, one or more mass storage devices 615, one or more input devices 620, one or more output devices 625, and network interface 630. One or more processors 605 are, in some examples, configured to implement functionality and/or process instructions for execution within the computer system 600. For example, the processors 605 may process instructions stored in memory 610 and/or instructions stored on mass storage devices 615. Such instructions may include components of an operating system 635 or software applications 640. Computer system 600 may also include one or more additional components not shown in FIG. 6, such as a housing, power supply, battery, global positioning system (GPS) receiver, and so forth.

Memory 610, according to one example, is configured to store information within the computer system 600 during operation. Memory 610, in some example embodiments, may refer to a non-transitory computer-readable storage medium or a computer-readable storage device. In some examples, memory 610 is a temporary memory, meaning that a primary purpose of memory 610 may not be long-term storage. Memory 610 may also refer to a volatile memory, meaning that memory 610 does not maintain stored contents when memory 610 is not receiving power. Examples of volatile memories include random access memories (RAM), dynamic random access memories (DRAM), static random access memories (SRAM), and other forms of volatile memories known in the art. In some examples, memory 610 is used to store program instructions for execution by the processors 605. Memory 610, in one example, is used by software (e.g., the operating system 635 or software applications 640). Generally, software applications 640 refer to software applications suitable for implementing at least some operations of the methods for providing a location-based gaming experience as described herein.

One or more mass storage devices 615 can also include one or more transitory or non-transitory computer-readable storage media and/or computer-readable storage devices. In some embodiments, mass storage devices 615 may be configured to store greater amounts of information than memory 610. Mass storage devices 615 may further be configured for long-term storage of information. In some examples, the mass storage devices 615 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 6, the computer system 600 may also include one or more input devices 620. The input devices 620 may be configured to receive input from a user through tactile, audio, video, or biometric channels. Examples of input devices 620 may include a keyboard, keypad, mouse, trackball, touchscreen, touchpad, microphone, one or more video cameras, image sensors, fingerprint sensors, or any other device capable of detecting an input from a user or other source, and relaying the input to computer system 600, or components thereof.

The output devices 625, in some examples, may be configured to provide output to a user through visual or auditory channels. Output devices 625 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. Output devices 625 may also include a touchscreen, presence-sensitive display, or other input/output capable displays known in the art.

The computer system 600, in some example embodiments, also includes network interface 630. The network interface 630 can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, among others. The network interface 630 may be a network interface card, such as an Ethernet card, an optical transceiver, a radio frequency transceiver, or any other type of device that can send and receive information.

The operating system 635 may control one or more functionalities of the computer system 600 and/or components thereof. For example, the operating system 635 may interact with the software applications 640 and may facilitate one or more interactions between the software applications 640 and components of the computer system 600. As shown in FIG. 6, the operating system 635 may interact with or be otherwise coupled to the software applications 640 and components thereof. In some embodiments, software applications 640 may be included in operating system 635. In these and other examples, virtual modules, firmware, or software may be part of the software applications 640.

Thus, methods of and systems AI-based analysis of oral surveys have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for Artificial Intelligence (AI)-based analysis of oral surveys, the system comprising:
   a user device;
   an acoustic sensor associated with the user device, the acoustic sensor being configured to sense an ambient acoustic signal;
   a processor communicatively coupled to the user device and to the acoustic sensor, wherein the processor is configured to:
      prompt a user to provide, via the user device, an oral survey concerning a subject;
      provide, via the user device, the user with an interface configured to receive the oral survey;
      receive, via the acoustic sensor, the ambient acoustic signal;
      analyze the ambient acoustic signal to detect presence of a voice of the user; and
      in response to detection, record, via the acoustic sensor, the ambient acoustic signal for a predetermined time to obtain, via the interface and the acoustic sensor, the oral survey concerning the subject in a free format; and
   a remote computing system communicatively coupled to the processor, the remote computing system being configured to:
      analyze the oral survey with the AI to determine key parameters associated with the subject, wherein the determining of the key parameters includes detecting words in the oral survey and determining that the words are relevant to the subject; and
      based on the key parameters, generate a structured survey report concerning the subject.

2. The system of claim 1, wherein the remote computing system is further configured to:
   receive a plurality of further oral surveys concerning the subject from a plurality of user devices associated with a plurality of users;
   analyze the plurality of further oral surveys using the AI to determine a set of common parameters associated with the subject; and
   based on the set of common parameters, generate an aggregated survey report for the plurality of users.

3. The system of claim 2, wherein the remote computing system is further configured to provide the aggregated survey report to a client.

4. The system of claim 2, wherein the remote computing system is further configured to:
   detect one or more stand-out parameters in the set of common parameters, wherein the one or more stand-out parameters exceed one or more threshold values; and
   issue an alert concerning the one or more stand-out parameters.

5. The system of claim 1, wherein the subject is related to a product associated with a manufacturer of the product or a service associated with a provider of the service.

6. The system of claim 1, wherein the oral survey is initiated via one or more of the following: a link, a text message, a Quick Response (QR) code printed on a product, a record button, and a voice prompt.

7. The system of claim 1, wherein the subject includes one of the following: a product, a service, and a policy.

8. The system of claim 1, wherein the analyzing the oral survey includes:
   determining demographics associated with the user;
   breaking down a user speech of the oral survey by parameters;
   determining the key parameters related to the subject;
   detecting keywords in the user speech; and
   scoring the key parameters based on the keywords.

9. The system of claim 1, wherein the structured survey report includes a data visualization.

10. The system of claim 9, wherein the data visualization includes a graph or a diagram.

11. The system of claim 1, wherein the structured survey report includes a completed questionnaire.

12. The system of claim 1, wherein the user is prompted to provide the oral survey during an advertising message.

13. A method for Artificial Intelligence (AI)-based analysis of oral surveys, the method comprising:
prompting a user to provide an oral survey concerning a subject;
providing the user with an interface configured to receive the oral survey;
receiving, via an acoustic sensor, an ambient acoustic signal, the acoustic sensor being configured to sense the ambient acoustic signal;
analyzing the ambient acoustic signal to detect presence of a voice of the user;
in response to the detection, recording, via the acoustic sensor, the ambient acoustic signal for a predetermined time to obtain, via the interface, the oral survey concerning the subject in a free format; analyzing the oral survey with the AI to determine key parameters associated with the subject, wherein the determining of the key parameters includes detecting words in the oral survey and determining that the words are relevant to the subject; and
based on the key parameters, generating a structured survey report concerning the subject.

14. The method of claim 13, further comprising:
receiving a plurality of further oral surveys concerning the subject from a plurality of users;
analyzing the plurality of further oral surveys using the AI to determine a set of common parameters associated with the subject; and
based on the set of common parameters, generating an aggregated survey report for the plurality of users.

15. The method of claim 14, further comprising providing the aggregated survey report to a client.

16. The method of claim 14, further comprising:
detecting one or more stand-out parameters in the set of common parameters, wherein the one or more stand-out parameters exceed one or more threshold values; and
issuing an alert concerning the one or more stand-out parameters.

17. The method of claim 13, wherein the oral survey is initiated via one or more of the following: a link, a text message, a Quick Response (QR) code printed on a product, a record button, and a voice prompt.

18. The method of claim 13, wherein the analyzing the oral survey includes:
determining demographics associated with the user;
breaking down a user speech of the oral survey by parameters;
determining the key parameters related to the subject;
detecting keywords in the user speech; and
scoring the key parameters based on the keywords.

19. A non-transitory processor-readable medium having instructions stored thereon, which when executed by one or more processors, cause the one or more processors to implement a method for Artificial Intelligence (AI)-based analysis of oral surveys, the method comprising:
prompting a user to provide an oral survey concerning a subject;
providing the user with an interface configured to receive the oral survey;
receiving, via an acoustic sensor, an ambient acoustic signal, the acoustic sensor being configured to sense the ambient acoustic signal;
analyzing the ambient acoustic signal to detect presence of a voice of the user;
in response to the detection, recording, via the acoustic sensor, the ambient acoustic signal for a predetermined time to obtain, via the interface, the oral survey concerning the subject in a free format; analyzing the oral survey with the AI to determine key parameters associated with the subject, wherein the determining of the key parameters includes detecting words in the oral survey and determining that the words are relevant to the subject; and
based on the key parameters, generating a structured survey report concerning the subject.

* * * * *